(12) United States Patent
Reeve

(10) Patent No.: US 11,341,270 B2
(45) Date of Patent: May 24, 2022

(54) AUTOMATICALLY REDACTING LOGS

(71) Applicant: International Business Machines Corporation, Armonk, NY (US)

(72) Inventor: John Anthony Reeve, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 16/749,351

(22) Filed: Jan. 22, 2020

(65) Prior Publication Data

US 2021/0224422 A1    Jul. 22, 2021

(51) Int. Cl.
 G06F 21/62     (2013.01)
 G06F 21/55     (2013.01)
 G06F 21/32     (2013.01)
 H04L 9/08      (2006.01)

(52) U.S. Cl.
 CPC .......... *G06F 21/6254* (2013.01); *G06F 21/32* (2013.01); *G06F 21/552* (2013.01); *H04L 9/085* (2013.01); *H04L 9/0894* (2013.01); *G06F 2221/2137* (2013.01)

(58) Field of Classification Search
 CPC .... G06F 21/6254; G06F 21/32; G06F 21/552; H04L 9/085; H04L 9/0894
 USPC .......................................................... 726/26
 See application file for complete search history.

(56) References Cited

U.S. PATENT DOCUMENTS

| 6,826,591 | B2 | 11/2004 | French et al. |
| 9,063,766 | B2 | 6/2015 | Chow et al. |
| 9,336,381 | B1 * | 5/2016 | Kane-Parry ............ G06F 21/577 |
| 9,552,272 | B1 | 1/2017 | Liang et al. |
| 10,083,320 | B2 | 9/2018 | Panchapakesan et al. |
| 10,089,166 | B2 | 10/2018 | Lehmann et al. |
| 10,484,343 | B1 * | 11/2019 | Silberman ............... H04L 63/12 |
| 2003/0212899 | A1 | 11/2003 | Curtis |
| 2012/0239987 | A1 | 9/2012 | Chow et al. |
| 2016/0378999 | A1 * | 12/2016 | Panchapakesan ... G06F 21/6254 726/26 |
| 2017/0041964 | A1 * | 2/2017 | Yerli ..................... H04L 63/083 |
| 2017/0046146 | A1 | 2/2017 | Jamjoom et al. |
| 2017/0104736 | A1 * | 4/2017 | Seul ....................... H04L 9/085 |
| 2017/0262329 | A1 | 9/2017 | Lehmann et al. |
| 2019/0080115 | A1 * | 3/2019 | Dongre ............... G06F 21/6227 |
| 2020/0136824 | A1 * | 4/2020 | Allen ................. G06Q 30/0601 |
| 2021/0150024 | A1 * | 5/2021 | Koshti .................. G06F 21/552 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.
"Credential Redaction," databricks, Nov. 23, 2019, 2 pages, https://docs.databricks.com/user-guide/security.html.

* cited by examiner

*Primary Examiner* — Kambiz Zand
*Assistant Examiner* — Phuc Pham
(74) *Attorney, Agent, or Firm* — Grant Johnson

(57) ABSTRACT

A computer-implemented method for automatically redacting logs, comprising receiving a secret associated with a request for service, splitting the secret into a first portion and a second portion, determining whether the second portion has an entropy value greater than a predefined threshold, and in response to the entropy value being greater than the threshold, registering the first portion for protection by a logging service.

18 Claims, 8 Drawing Sheets

AUTOMATICALLY REDACTING LOGS

BACKGROUND

Aspects of the present disclosure relate to computer security, more particular aspects relate to methods to limit or prevent logging of secret or otherwise restricted information, such as passwords, personal information, and sensitive personal information.

The development of the EDVAC computer system of 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

One area in which such advances have been made is in the use of microservices. Microservices generally refer to an architectural style that divides an application program into components, where each component is a full, but miniature, application that is focused on producing a single task. Microservice architectures typically implement that single task from start to finish, from the graphical user interface (GUI) to the database, or at least from the service application programming interface (API) to the database, so that different GUIs and client apps can reuse the same task functionality. Microservices typically have a well-defined interface and dependencies (to other microservices and to external resources) so that they can run fairly independently, and thus, can be developed fairly independently.

SUMMARY

According to embodiments of the present disclosure, a computer-implemented method for automatically redacting logs, comprising receiving a secret associated with a request for service, splitting the secret into a first portion and a second portion, determining whether the second portion has an entropy value greater than a predefined threshold, and in response to the entropy value being greater than the threshold, registering the first portion for protection by a logging service.

According to embodiments of the present disclosure, a computer-implemented method for automatically redacting logs, comprising receiving a fingerprint associated with a user credential, receiving a log request containing a proposed log entry, and comparing the fingerprint to the proposed log entry. In response to a match between the fingerprint and the proposed log entry, some embodiments may redact the fingerprint from the proposed log entry and log the redacted log entry.

According to embodiments of the present disclosure, a logging system, comprising and a client application adapted. The logging service may be adapted to receive a plurality of fingerprint associated with a plurality of user credentials, wherein a first fingerprint in the plurality of fingerprints is associated with a desired protection time window, receive a log request containing a proposed log entry, generate an optimized search list from the plurality of fingerprints, compare the proposed log entry to the optimized search list, in response to a match between the first fingerprint and the proposed log entry, redact the first fingerprint from the proposed log entry, log the redacted log entry; and responsive to the desired protection time window associated with the first fingerprint expiring, remove the first fingerprint from the optimized search list. The client application may be adapted to request a secret from an encrypted credential store, receive the secret from the encrypted credential store, split the secret into a first portion and a second portion, determine whether the second portion has an entropy value greater than a threshold, and in response to the entropy value being greater than the threshold, register the first portion for redaction with the logging service.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
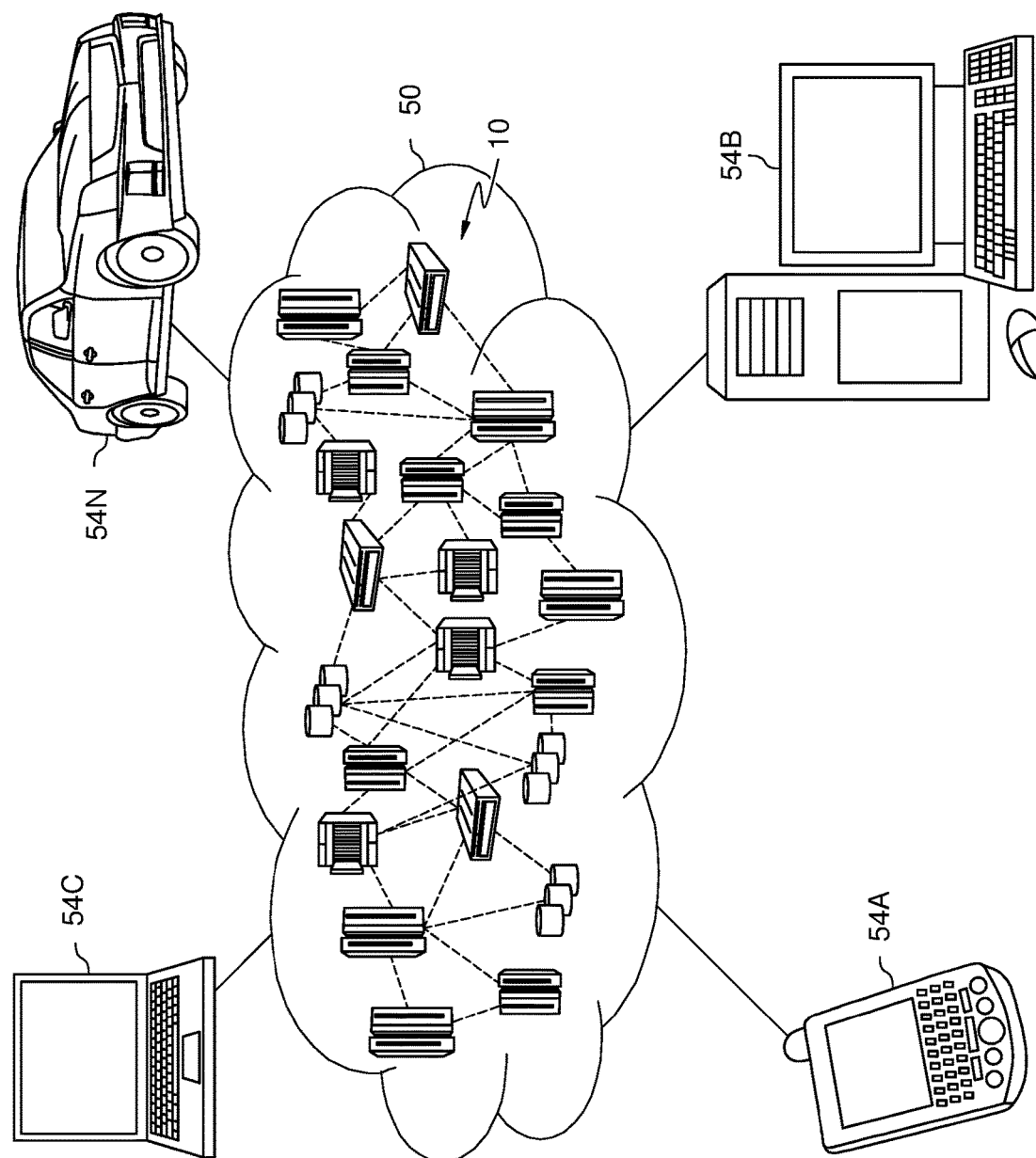
FIG. 1 illustrates a cloud environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security, and more particular aspects relate to methods to limit or prevent logging of secret or otherwise restricted information, such as passwords, personal information, and sensitive personal information. While the present disclosure is not necessarily limited to such applications, various aspects of the disclosure may be appreciated through a discussion of various examples using this context.

One common microservice is a logging function. Some logging functions record events, status messages, resources used, and/or errors that occur over the life cycle of an application. Other logging functions record messages between different users (including other applications and microservices) of a computer system.

A common problem with logging systems is that restricted information can be inadvertently written to the logs. Worse, access to these logs is often far less restrictive than access to the underlying system secrets (e.g., passwords, private keys, etc.) As a result, it is very easy for a coding error (either accidental or malicious) to be made that will log secret information, and then for that information to be further leaked via analysis of the log files.

Accordingly, some embodiments may provide a register function associated with the logging function, which can be provided with a secret by a microservice as soon as it is first retrieved from an encrypted store and decrypted. The logging microservice may then search any future log entries for the secret before writing that entry to the log files. In this way, as long as the microservice registers the secret as soon as it is retrieved, then that secret will never be logged. For a large set of registered secrets (e.g., password files to be registered during a startup event or sequence of a microservice), some embodiments may support registering the set of secrets in one call, and thereby ensure no static secrets are leaked via logging.

Some embodiments may also allow for the logging mechanism to only register a predetermined part of the password (e.g., the first 6 characters or other configurable number of characters) to be used as a filter expression by the redaction function. These embodiments may be desirable because they would allow log entries that contained the password to be identified, but only give the possibility of an attacker obtaining those initial characters, and not the full password. In these embodiments, the logging microservice may also reject any secret that was registered that was shorter than the configurable number of characters and/or that was too easy to guess after removing the predetermined password part (e.g., the remaining portion of the password did not have an entropy value greater than a threshold at which it would be practically unguessable through brute force cracking, dictionary attacks, or other attack common methods. In some embodiments, entropy value may be calculated by the size of the character set raised to the power of the password length).

Some embodiments may further combine filter expressions so that each secret does not have to be searched for independently, but instead, shared characters sequences between secrets could be searched for first before doing a full matching search. The logging client may then update and maintain these shared search strings as secrets are registered and/or as their protection windows expire. For example, if the logging mechanism has the secrets characters "asdfgh" and "qwefgh," then the logging mechanism may construct a filter to first look for "fgh" before applying the search for "asdfgh" or "qwefgh," and hence, reduce the amount of searching required. In these embodiments, this mechanism may also be limited to the most important secrets if the total set would be too much to allow the logging to be efficient.

Some embodiments may provide for registration of a protection window for the registered secrets. For example, a small, configurable time value (e.g., 5-10 seconds) may help ensure that, in a system with many users and many secrets, the search filter set does not grow too large, and thus, impact performance. In some embodiments, the expiry time may be configurable when passwords are registered. This may allow for secrets based on users in a multitenancy environment to be only registered for short periods while they are being used, and hence, not end up with the logging client having a large number of secrets registered.

In some embodiments, once a secret is registered, any calls between microservices will result in the redaction info being provided as part of the request, such as included in a header of the call to the other microservice. These embodiments may allow remote microservices to also be able to redact the secret. This may be advantageous in scenarios in which one microservice is responsible for decrypting a secret that another microservice needs to consume, at least because it may help ensure that the secret will be redacted in any downstream code. In particular, this may help protect against libraries or services that were sent the secret but did not realize the data they were sent had a secret and so logged the data's contents with the secret.

One feature and advantage of some embodiments is that they may help identify sources of improper logging that would not be apparent by mere source code inspection. That is, there are many ways in which secrets can be logged without it being obvious that the logging of secrets will occur. For example, the secret could be part of a larger object being logged or part of an error message being logged. Another feature and advantage of some embodiments is that they do not rely on the authentication secrets being properly and consistently associated with a key phrase or tag (e.g., "password=" or "api_key="). This can be a particular issue in heterogeneous computing environments.

Another feature and advantage of some embodiments is that they allow for less strict control of code paths in which the secrets are unencrypted, and thus, may reduce certification costs. Again, this can be a particular issue in heterogeneous computing environments.

The aforementioned advantages are example advantages, and not all advantages are discussed. Furthermore, embodiments of the present disclosure can exist that contain all, some, or none of the aforementioned advantages while remaining within the spirit and scope of the present disclosure.

Cloud Computing

FIG. 1 illustrates an embodiment of a cloud environment consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain 3 resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
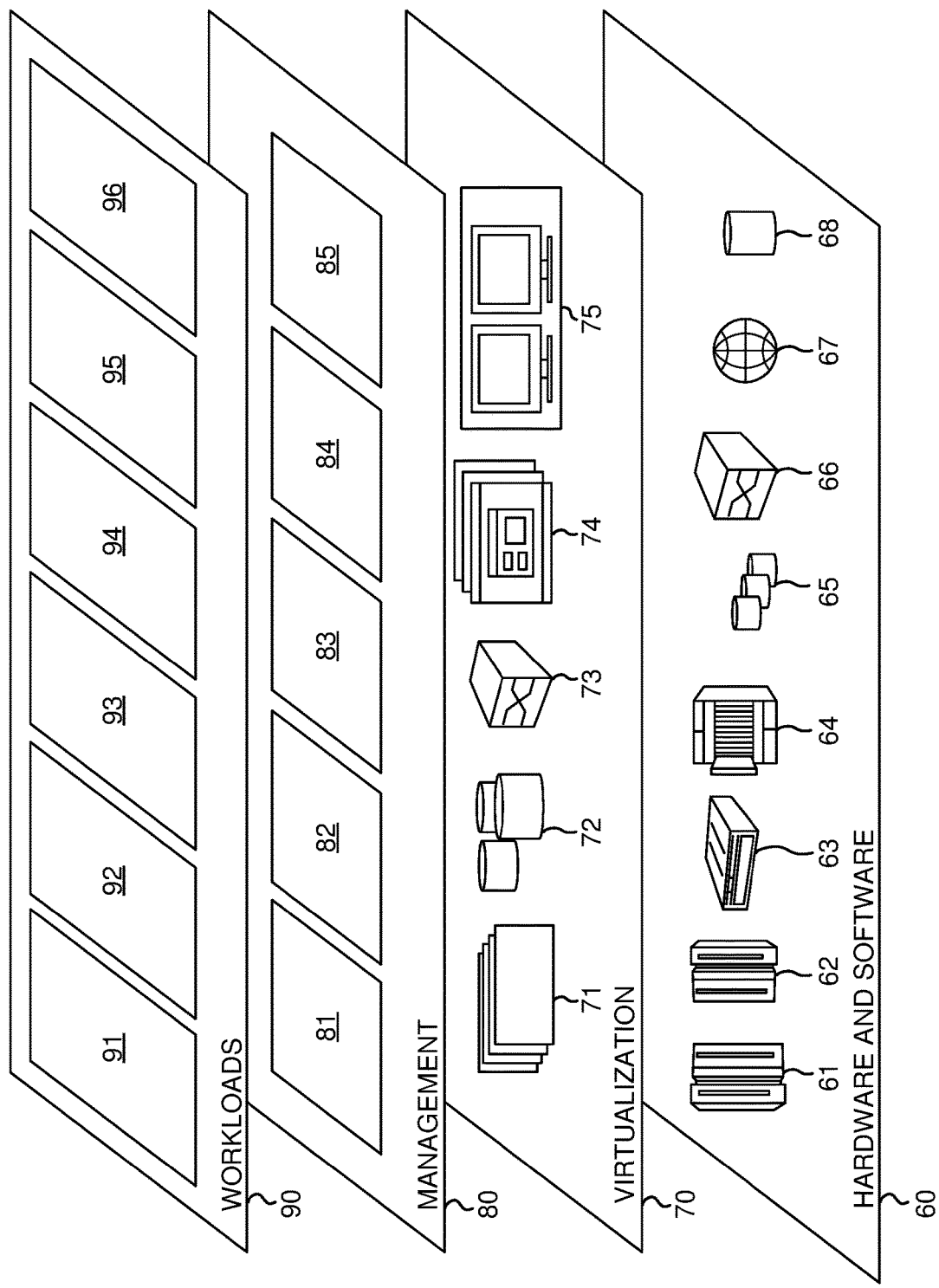
FIG. 2 illustrates a set of functional abstraction layers provided by cloud computing environment, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and logging 96.

Data Processing System

Figure 3:
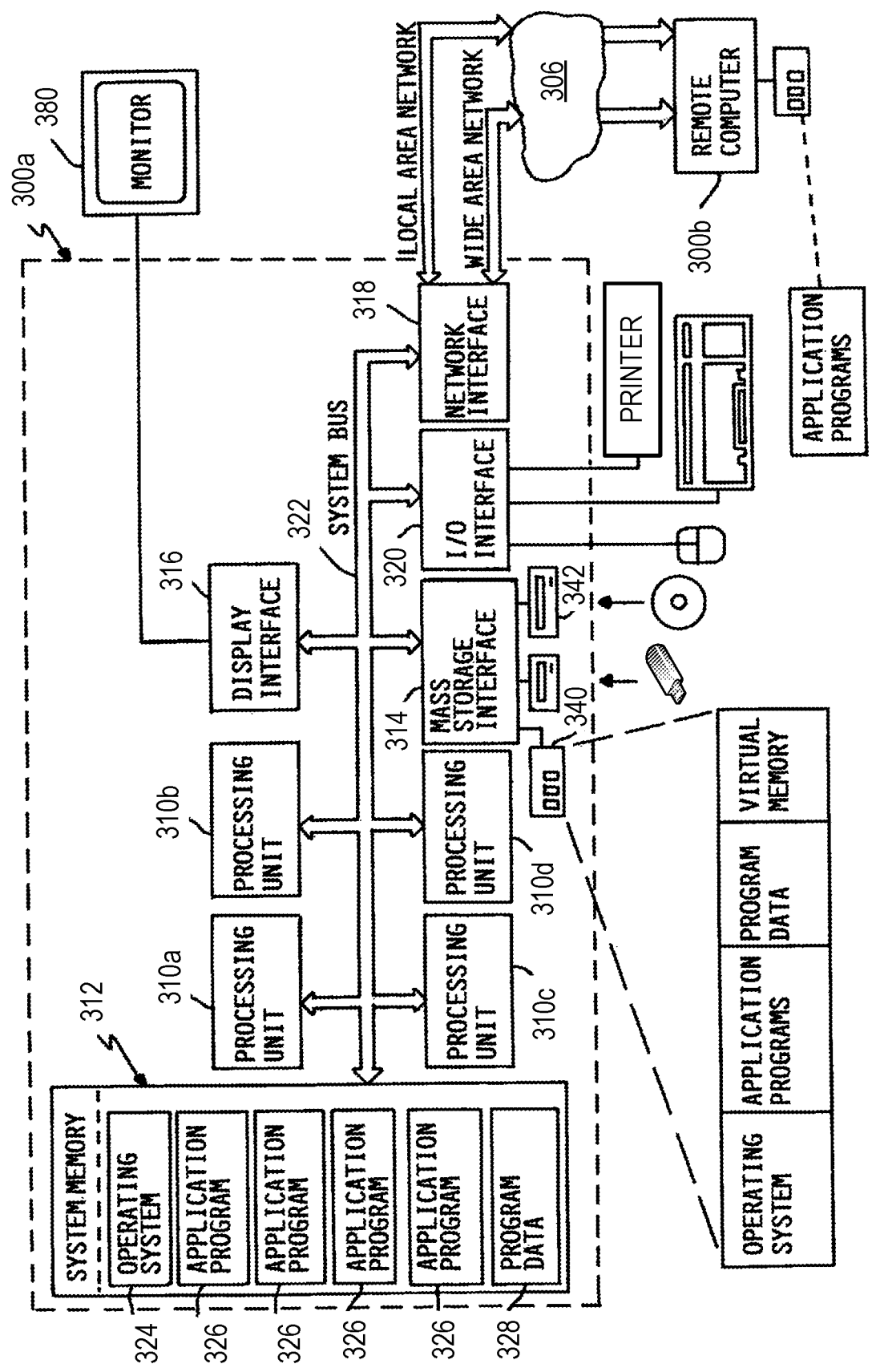
FIG. 3 illustrates an embodiment of a data processing system suitable for use in a cloud environment, consistent with some embodiments.

FIG. 3 illustrates an embodiment of a data processing system (DPS) 300 suitable for use in a cloud environment. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310a-310d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 342, which are in communication with the processors 310 through the system bus 322. The program code in the different embodiments may be embodied on different physical or tangible computer readable media, such as the system memory 312 or the mass storage devices 340, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 342, which are typically rotating magnetic disk drive storage devices, a solid-state storage device (SSD) that uses integrated circuit assemblies as memory to store data persistently, typically using flash memory, or a combination of the two. However, the mass storage devices 340, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more display units 380, the computer systems 300 does not necessarily require a display unit 380 because all needed interaction with users and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Application Architecture

Figure 4A:
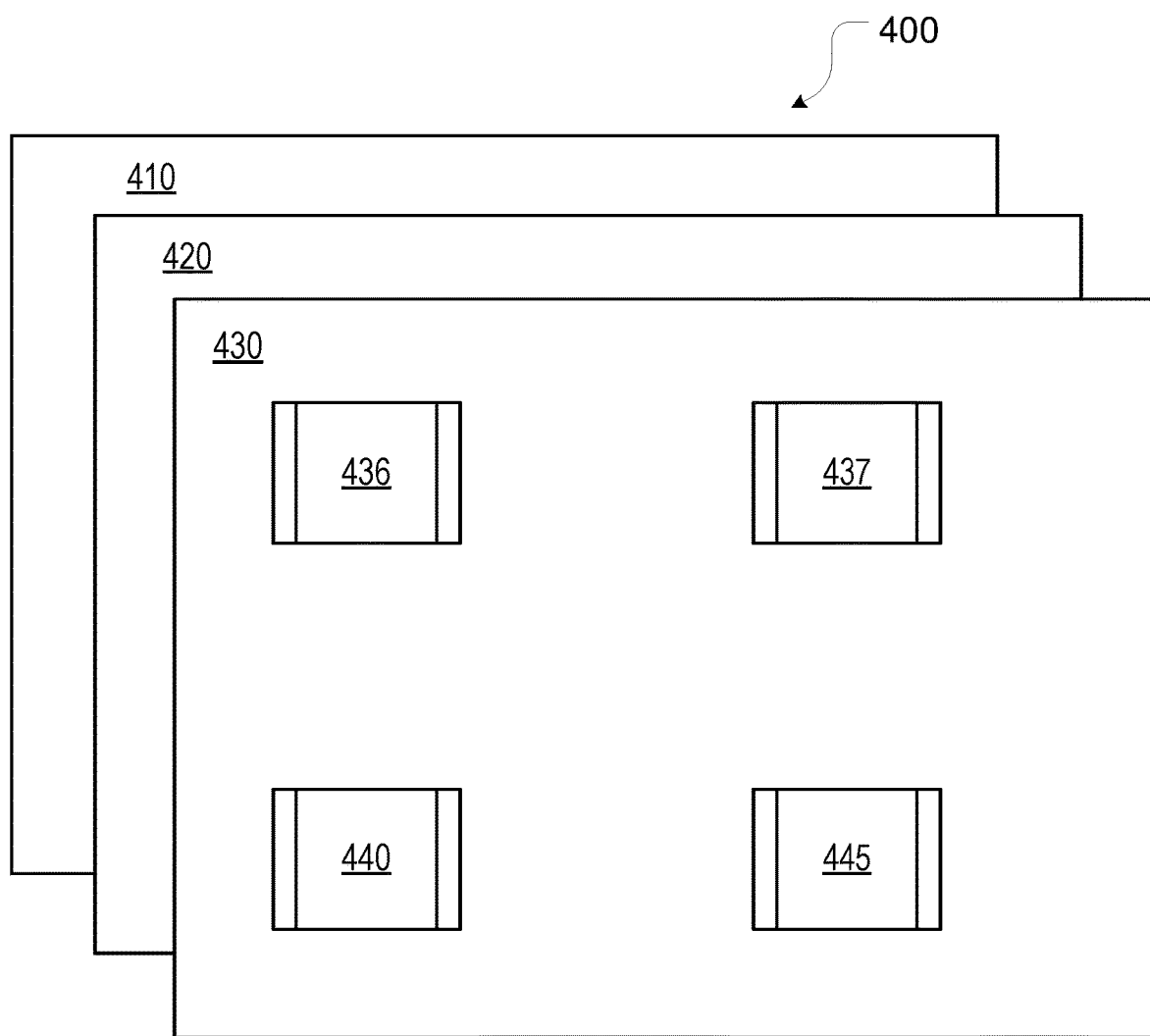
FIG. 4A depicts an example monolithic service architecture, consistent with some embodiments.
Figure 4B:
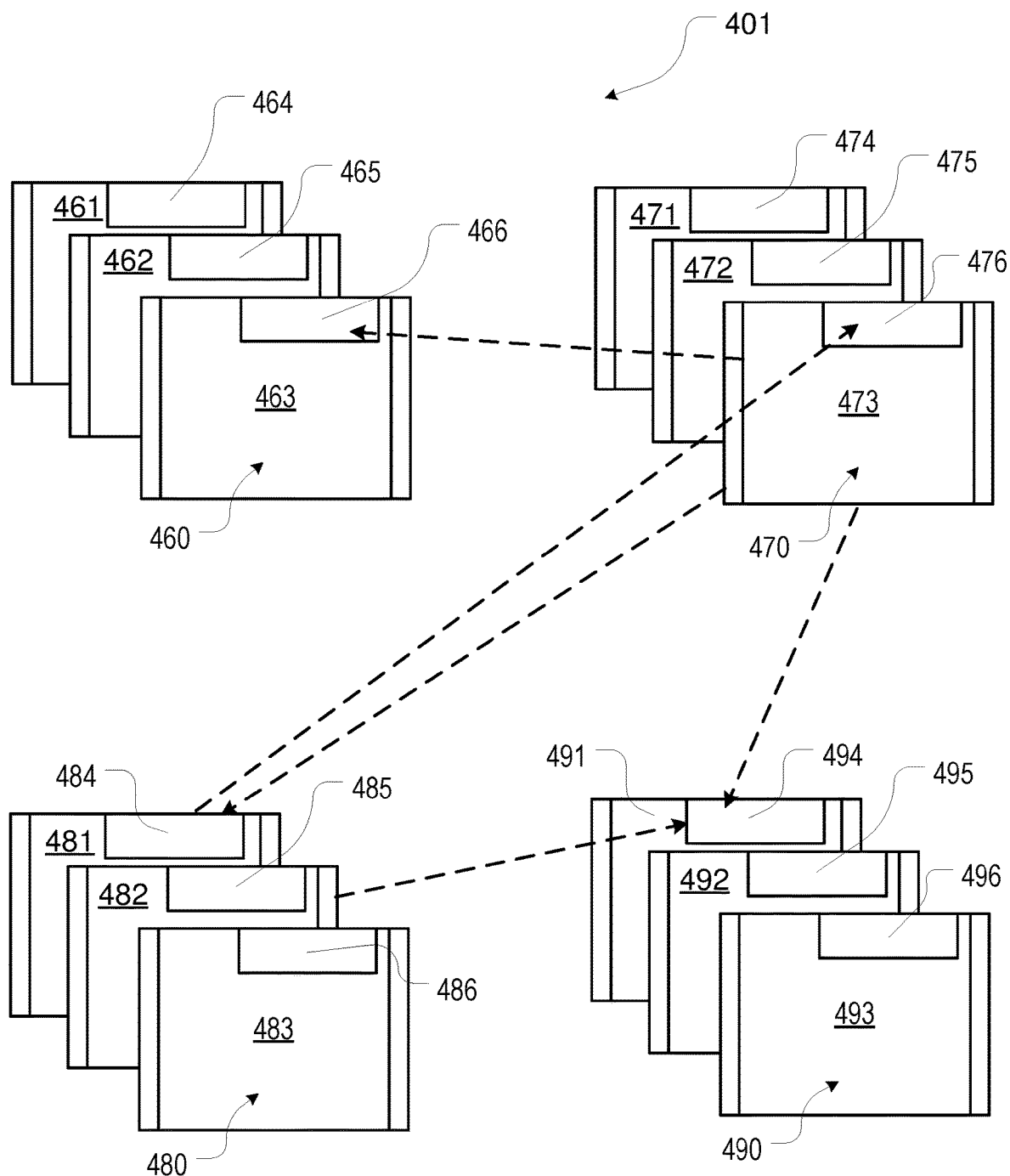
FIG. 4B depicts an example microservice-based architecture, consistent with some embodiments

FIG. 4A depicts an example monolithic service architecture, while FIG. 4B depicts an example microservice-based architecture, both suitable for use with some embodiments. In the architecture of FIG. 4A, the monolithic service 400 may be comprised of a plurality of service instances 410, 420 and 430 executing on one or more DPS 300. Each of these service instances may include several distinct functionalities, such as functions 436 and 437 within service instance 430. The monolithic architecture in FIG. 4A may also include a credential store 440 and a logging daemon 445.

In the microservice architecture 401 in FIG. 4B, applications may be structured as a loosely-coupled (e.g., fine-grained) collection of small, well-defined stateless services (referred to as microservices) executing on one or more DPS 300, which may communicate with each other only through well-defined application programming interfaces (APIs). In FIG. 4B, each functionality is in its own dedicated service. Thus, microservice 460 in FIG. 4B, may comprise microservice instances 461, 462 and 463, and may generally correspond to functionality 436 in service instance 430 in FIG. 4A, as well as the corresponding functionalities in service instances 410 and 420 in FIG. 4A. Microservice 470 in FIG. 4B, which may generally comprise microservice instances 471, 472 and 473, and may correspond to functionality 437 in service instance 430 in FIG. 4A, as well as the corresponding functionalities in service instances 410 and 420 in FIG. 4A.

Microservice 480 in FIG. 4B, which may comprise microservice instances 481, 482 and 483, and may generally correspond the credential store 440 in service instance 430 in FIG. 4A, as well as the corresponding functionalities in service instances 410 and 420 in FIG. 4A. Microservice 490 in FIG. 4B, may comprise microservice instances 491, 492 and 493, which may generally correspond to the logging daemon 445 in service instance 430 in FIG. 4A, as well as the corresponding functionalities in service instances 410 and 420 in FIG. 4A.

As discussed above, each microservice instance may include a well-defined API. Within microservice 460, for example, instances 461, 462 and 463 may include respective APIs 464, 465 and 466. Within microservice 470, instances 471, 472 and 473 may include respective APIs 474, 475 and 477. Within microservice 480, instances 481, 482 and 483 may include respective APIs 484, 485 and 488. Within microservice 490, instances 491, 492 and 493 may include respective APIs 494, 495 and 499.

As also discussed above, microservices may communicate with each other through their APIs. Thus, in FIG. 4B, instance 473 within microservice 470 may communicate with API 466 of instance 463 within microservice 460. Instance 473 within microservice 470 may also communicate with API 484 of instance 481 within the credential store microservice 480 and with API 494 of instance 491 of the logging microservice 490. In this way, an application in FIG. 4B may comprise two or more loosely-coupled and/or fine-grained microservices, with well-defined web service API(s), working together to generate responses to end user requests. Applications may be composed of hundreds of such instances of heterogeneous microservices, backed by scalable data stores. Individual microservices can be owned and operated by independent developers and/or teams. Each microservice can be developed and deployed independently of other microservices by independent teams of software developers who interact with other services only through their exposed web services' APIs. From a code development and operations perspective, each microservice has its own branch with updates to the service being committed to that branch. Services are updated frequently, independent of other services, while maintaining compatibility.

Logging Function

Figure 5:
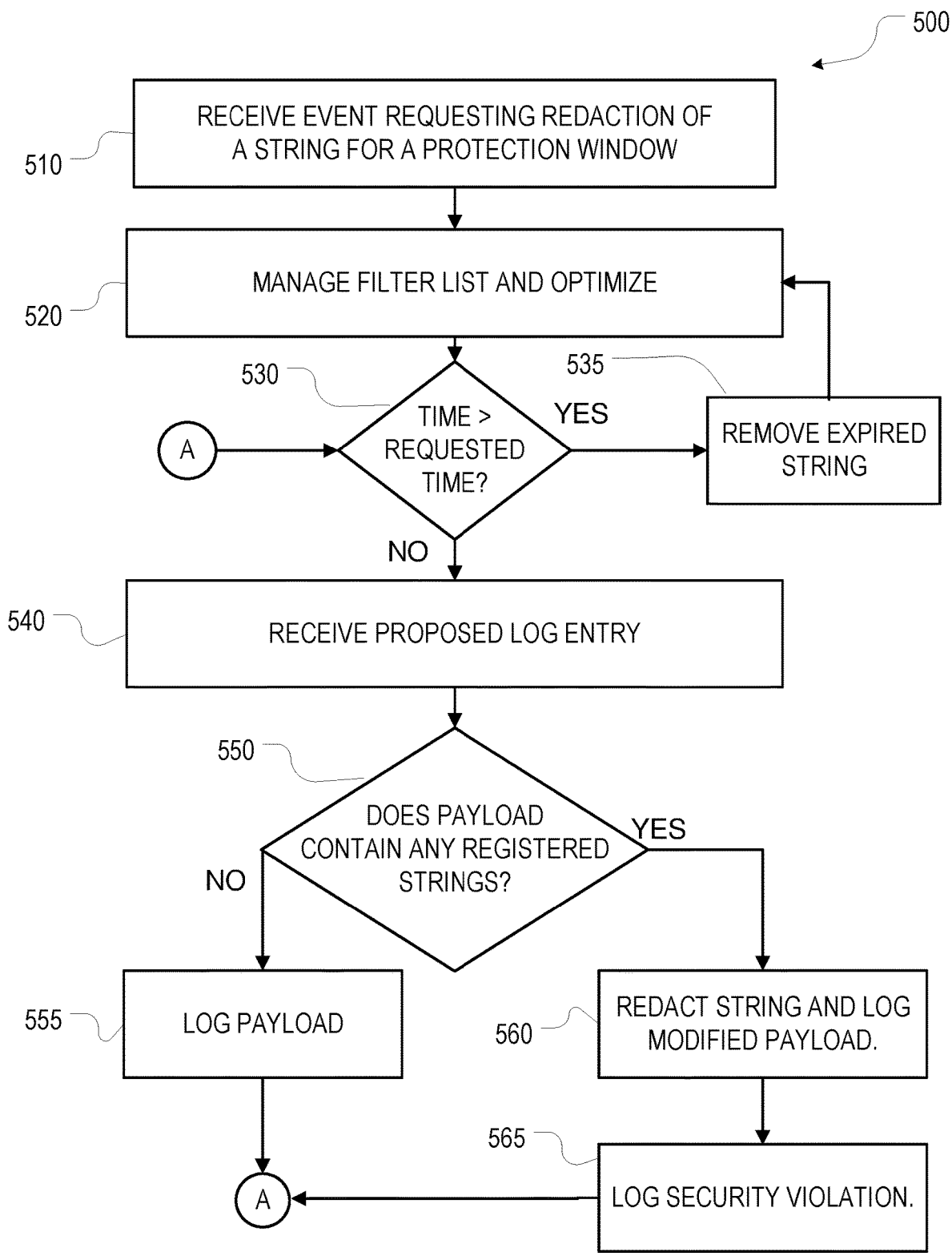
FIG. 5 is a flow chart for a logging function, consistent with some embodiments.

FIG. 5 is a flow chart illustrating a process 500 for a logging function consistent with some embodiments, including logging daemon 445 and logging microservice 490. At operation 510, the logging function may receive a request from an application or other microservice requesting registration of a protected string. In some embodiments, this protected string may be the secret information itself (e.g., a user's credentials), or may be a fingerprint of the secret information (e.g., a partially redacted portion of the user's credentials). Also at operation 510, some embodiments may additionally receive a requested protection window (i.e., redaction period) during which the logging function should monitor for the protected string. At operation 520, the logging function adds the protected string to a list of search terms. In some embodiments, the logging function may also optimize the list of search terms to minimize performance impact. For example, some embodiments may combine filter expressions so that each secret does not have to be searched for independently, but instead, shared characters sequences between secrets may be searched first before doing a full matching search. The logging function may further maintain these shared search strings as secrets are registered and as they expire at the end of the protection window. For example, if the logging function is asked to protect secrets characters "asdfgh" and "qwefgh," then the logging mechanism may construct a filter to first look for "fgh" before applying the search for "asdfgh" or "qwefgh" and hence reduce the amount of searching required. Some logging functions may also support a priority value for each protected string, and then, if the impact from searching the full list increases above a threshold, these embodiments may only search for the highest priority secrets.

At operation 530, the logging function may periodically review the list of registered secrets to determine if the they have expired, e.g., whether the current time is after the requested protection window associated with that particular registered string. If the registered string has expired, the logging function removes the expired string from the list of search items at operation 535, and then reoptimizes the list of search terms at operation 520. If no secrets have expired, then the logging system awaits receipt of a logging request from a client microservice at operation 540.

Upon receipt of a proposed log entry, the logging function may detect whether or not the payload of the proposed log entry contains any of the registered secrets at operation 550. One suitable method is to compare the registered strings (e.g., the fingerprints that compose the optimized search list) to the payload. If not, then the logging function logs the payload of the proposed log entry in the appropriate log file or files at operation 555 and returns to operation 530. If the payload of the proposed log entry does contain a registered string, then in some embodiments, the logging function may remove the registered string from the payload, forming a redacted log entry, and logs the redacted log log entry at operation 560. In some embodiments, the logging function may also replace the registered string with an error message or code and then log the edited log entry as the redacted log entry. In still other embodiments, the logging function may replace the entire payload with some error message or code and then log that replacement message as the redacted log entry.

Next, some embodiments may optionally generate and then log enhanced information about the potential security violation, such as: a log message identifier, the name of the microservice that sent the log request, and the name of the microservice that registered the phrase that appeared in the payload, and the registered phrase. Some embodiments may further email or otherwise notify a system administrator about the potential security violation at operation 565, including sending the enhanced information.

Client Microservices

Figure 6:
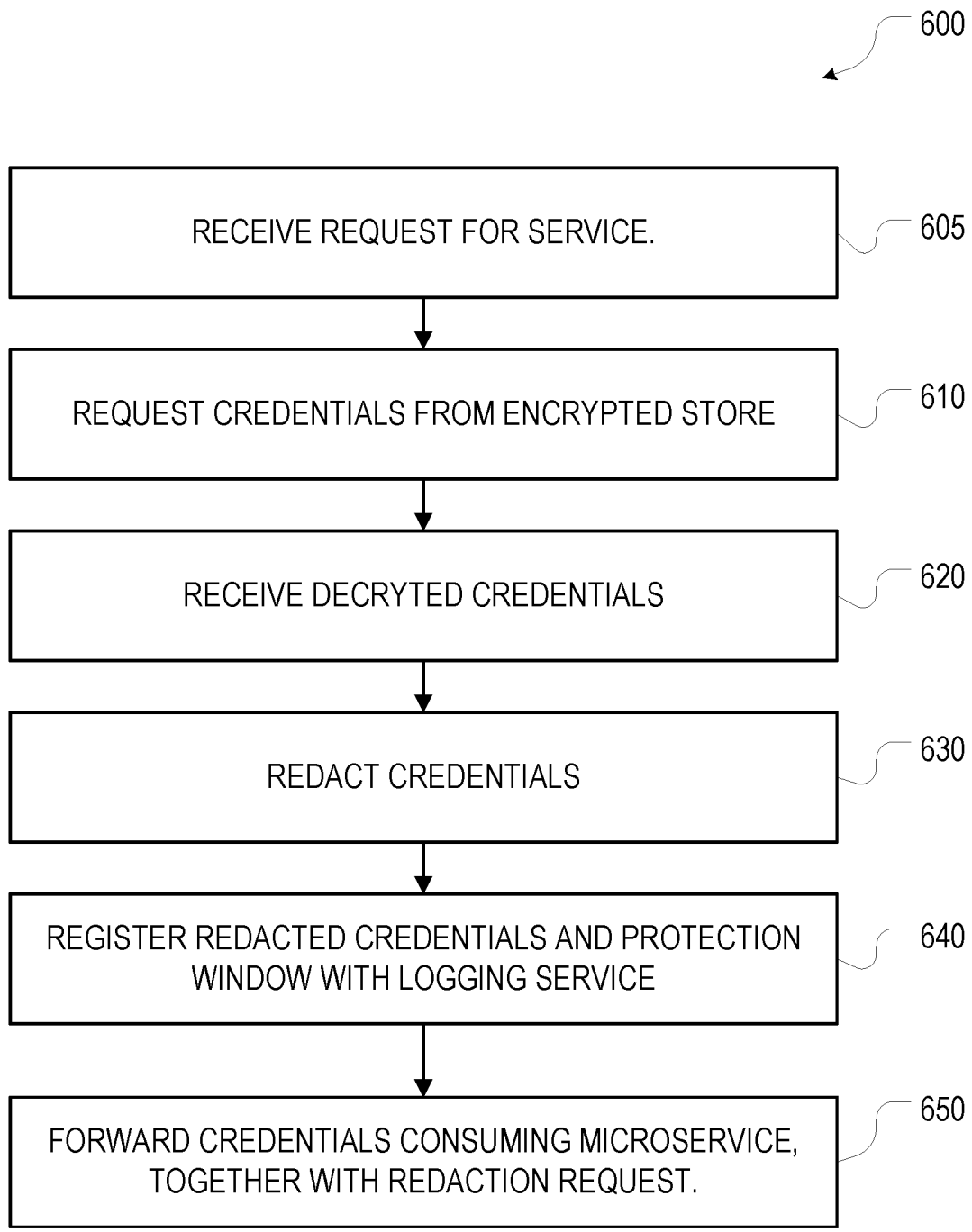
FIG. 6 is a flow chart for a client application, consistent with some embodiments.

FIG. 6 is a flow chart of a process 600 for a client application, such as service instance 430 or microservice 470, consistent with some embodiments. At operation 605, a user or another microservice may initiate an action for which authorization is required. In response, the client application may send a request to an encrypted credential store microservice for the user's credentials at operation 610. The encrypted credential store microservice responds with the decrypted credentials at operation 620.

At operation 630, the client application may redact a portion of those credentials to form a fingerprint for the credentials. For example, the client application may split the credential into a first portion containing a predetermined number of characters (e.g., 6) and a second portion containing the remainder of the credential. If the second portion has sufficiently entropy value to be practically unguessable, the client application may then register only the first portion of the credential as a type of fingerprint with a logging service. This feature may be desirable because the fingerprint may be sufficient to identify log entries that contained the credential, but only give the possibility of an attacker obtaining those predetermined number of characters and not the full credential. In some embodiments, the client application may reject any credential if the second portion is that is shorter than this predetermined number of characters, or that would be too easy to guess after redacting the predetermined portion of the secret (i.e., the remaining second portion of the credential did not have an entropy value sufficiently high to be practically unguessable).

At operation 640, the client application may send a registration request to the logging function, asking that the fingerprint be excluded from future logging messages. In some embodiments, this registration request may also include a desired protection window e.g., a time period during which the fingerprint should be protected. At operation 650, the client application continues to process the action initiated at operation 605.

Some embodiments may keep the fingerprint in the logging client library that is running in the microservice that retrieved and is using the credentials. In other embodiments, for some applications and for some types of requests, one microservice may be allowed to call another microservice. In these embodiments, the client application may send the fingerprint, or an identifier of or pointer to that information, to the called microservice when the call between the two services might contain credentials, passwords, or other sensitive information. In this way, called microservice can also include the same log redaction information in its client library. To give an example of some of these embodiments in operation, a system has two microservices: a first microservice that manages customers' details, and a second microservice that emails the customers. The first microservice in this example might be able to access details about how to contact the customers, including a password that is required to access an email server. The first microservice may then call the second microservice to send the email, passing across the required password. In these embodiments, the first microservice may also pass across its current log redaction filter to the second microservice as part of the call. The second microservice would then register those redaction(s) i.e., the server password, with its log filter, which would then stop its logging microservice being able to log the received email server password. In some embodiments, a pre-check could be made against the sent data to see if the redact filter is needed at all and, if the filter finds no password in the sent data, then it does not send the filter either.

Encrypted Credential Store

Figure 7:
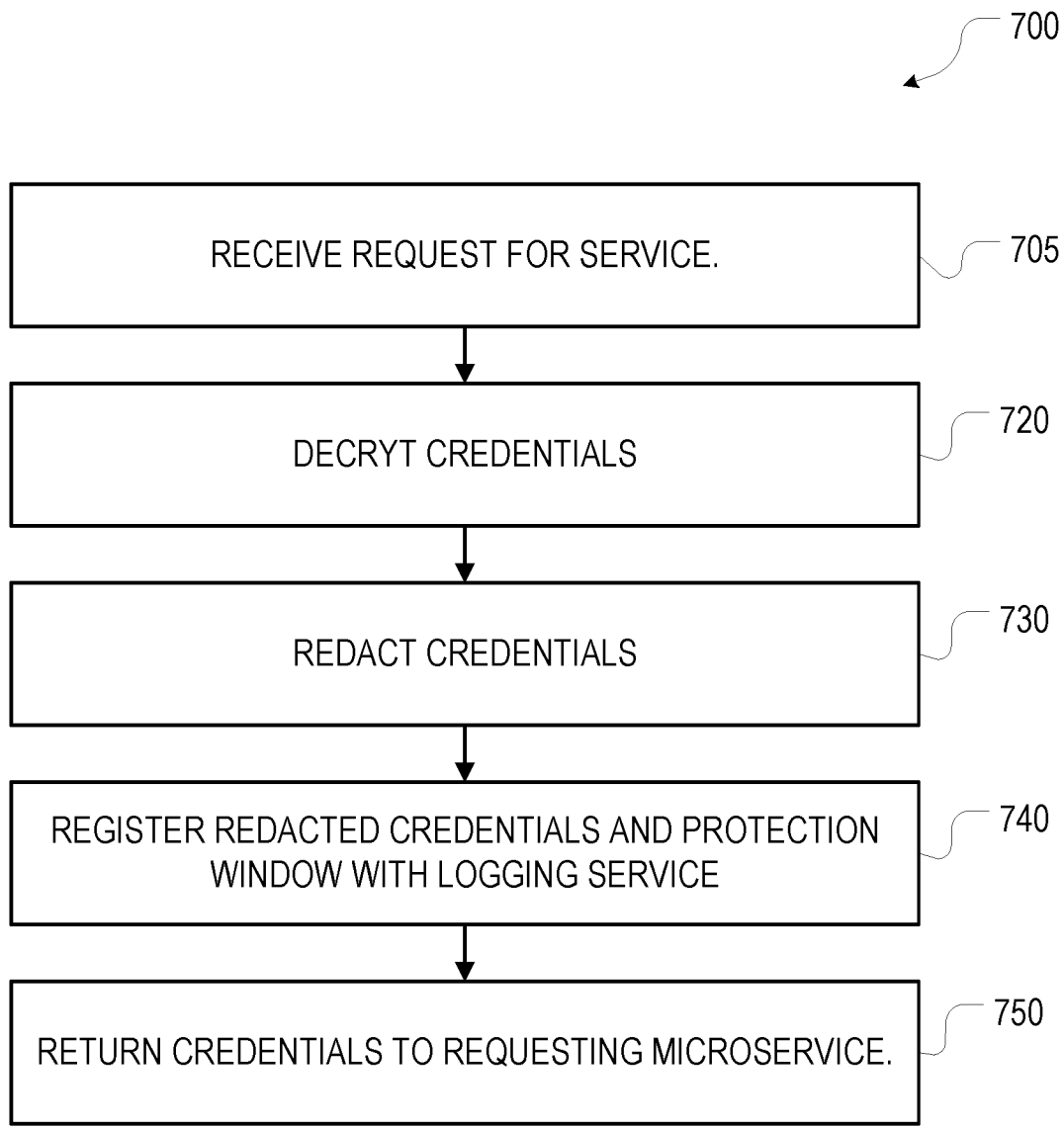
FIG. 7 is a flow chart for a credential store, consistent with some embodiments.

FIG. 7 is a flow chart of a process 700 for an alternate and/or complementary embodiment in which a credential store (such as credential store 440 or credential microservice 481, 482, 483) registers the credentials with the logging service (such as logging daemon 445 or logging microservice 491, 492, 493), consistent with some embodiments. These embodiments may be desirable for legacy environments because they may require fewer changes to existing applications and/or microservices. At operation 705, the encrypted credential store may receive a request from a user or another microservice for the user's credentials. The encrypted credential store microservice responds by decrypting the requested credentials at operation 720.

At operation 730, the encrypted credential store may redact a portion of those credentials to form a fingerprint for the credentials. For example, the encrypted credential store may split the credential into a first portion containing a predetermined number of characters (e.g., 6) and a second portion. The encrypted credential store may then register only the first portion of the credential as a type of fingerprint with a logging service.

At operation 740, the encrypted credential store may send a registration request to the logging client microservice, asking that the fingerprint be excluded from future logging messages. In some embodiments, this registration request may also include a desired protection window e.g., a time period during which the fingerprint should be protected. At operation 750, the encrypted credential store returns the decrypted credentials to the requesting user or microservice.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method for automatically redacting logs, comprising:
at one of a plurality of client applications:
receiving a secret associated with a request for service;
splitting, by a processor, the secret into a first portion and a second portion;
determining, by the processor, whether the second portion has an entropy value greater than a predefined threshold;
in response to the entropy value being greater than the threshold, registering the first portion for protection by a logging service;
registering a protection time window for the first portion with the logging service, wherein the protection time window comprises a predetermined period during which the logging service monitors for the first portion;
at a logging service:
receiving a plurality of first portions associated with a plurality of secrets from the plurality of client applications;
combining the plurality of first portions into an optimized search list;
detecting one of the plurality of first portions in a log entry within its associated protection time window;
in response to the detecting, removing the detected one of the plurality of first potions from the log entry to form a redacted log entry;
logging the redacted log entry on a computer readable storage media
removing a second of the plurality of first portion from the search list after expiration of its associated protection time window; and
reoptimizing the remaining plurality of first portions into a reoptimized search list.

2. The method of claim 1, further comprising, at the logging service, logging a security violation.

3. The method of claim 1, wherein the protection time window is between about 5 and about 10 seconds.

4. The method of claim 1, wherein the secret comprises a password and wherein the first portion comprises a fingerprint for the password.

5. The method of claim 1, further comprising:
requesting the secret from an encrypted credential store;
receiving the secret from the encrypted credential store.

6. The method of claim 5, further comprising, by the credential store, additionally registering the first portion for protection by the logging service.

7. The method of claim 6, further comprising:
calling a second microservice in a call, wherein the call includes the first portion;
transmitting the first portion to the second microservice; and
in response to the transmitting, by the second microservice, additionally registering the first portion for protection by the logging service.

8. The method of claim 7, further comprising registering a plurality of secrets during a startup event.

9. A computer-implemented method for automatically redacting logs, comprising:
receiving a plurality of fingerprints, wherein each fingerprint is associated with a user credential and a desired protection time window associated with the fingerprint, wherein the protection time window comprises a predetermined period during which a logging service monitors for the fingerprint;
generating an optimized search string from the plurality of fingerprints;
receiving a log request containing a proposed log entry;
comparing the fingerprint to the proposed log entry, wherein the comparing of the fingerprint to the proposed log entry comprises comparing the optimized search string to the proposed log entry;

in response to a match between the fingerprint and the proposed log entry within the desired protection time window, redacting the fingerprint from the proposed log entry; and logging the redacted log entry; and responsive to one of the desired protection time window expiring:
  removing the associated fingerprint; and
  regenerating the optimized search string from the remaining plurality of fingerprints.

10. The computer implemented method of claim 9, wherein the protection time window is between about 5 and about 10 seconds.

11. The computer-implemented method of claim 9, wherein redacting the fingerprint from the proposed log entry comprises:
  replacing the proposed log entry with an error message to form a replacement log entry; and
  logging the replacement log entry as the redacted log entry.

12. The computer-implemented method of claim 9, wherein redacting the fingerprint from the proposed log entry comprises:
  replacing the fingerprint with an error message to form an edited log entry; and
  logging the edited log entry as the redacted log entry.

13. The computer-implemented method of claim 9, further comprising at a client application:
  receiving a secret associated with a request for service;
  splitting the secret into a first portion and a second portion;
  determining an entropy value for the second portion; and
  responsive to the entropy value being greater than a threshold, registering the first portion as the fingerprint.

14. The computer-implemented method of claim 13, wherein:
  the fingerprint is received from a client microservice; and
  the logging is performed by a logging microservice.

15. The computer implemented method of claim 14, further comprising, in response to a match between the fingerprint and the proposed log entry, logging a potential security violation.

16. The computer implemented method of claim 15, further comprising generating enhanced information about the potential security violation, the enhanced information comprising: a log message identifier, a name of a microservice that sent the proposed log entry, a name of a microservice that registered the fingerprint, and the fingerprint.

17. A logging system, comprising:
  a logging service adapted to:
    receive a plurality of fingerprint associated with a plurality of user credentials, wherein a first fingerprint in the plurality of fingerprints is associated with a desired protection time window and wherein the protection time window comprises a predetermined period during which the logging service monitors for the first portion;
    receive a log request containing a proposed log entry;
    generate an optimized search list from the plurality of fingerprints;
    compare the proposed log entry to the optimized search list;
    in response to a match between the first fingerprint and the proposed log entry within the protection time window, redact the first fingerprint from the proposed log entry;
    log the redacted log entry; and
    responsive to the desired protection time window associated with the first fingerprint expiring:
      removing the first fingerprint from the optimized search list; and
      regenerate the optimized search list from the remaining plurality of fingerprints;
  a client application adapted to:
    request a secret from an encrypted credential store;
    receive the secret from the encrypted credential store;
    split the secret into a first portion and a second portion;
    determine whether the second portion has an entropy value greater than a threshold; and
    in response to the entropy value being greater than the threshold, register the first portion for redaction with the logging service.

18. The system of claim 17, further comprising one or more processor coupled to one or more memories, the one or more memories containing instructions that, when executed on the one or more processors, cause the one or more processors to implement the logging service and the client application.

* * * * *